United States Patent [19]

Dawson

[11] 4,299,172
[45] Nov. 10, 1981

[54] STEERING SENSE REVERSING MECHANISM FOR GUIDED VEHICLES

[75] Inventor: John T. Dawson, Seattle, Wash.

[73] Assignee: The Boeing Company, Seattle, Wash.

[21] Appl. No.: 78,638

[22] Filed: Sep. 26, 1979

[51] Int. Cl.³ .............................................. B61F 9/00
[52] U.S. Cl. .................................... 104/247; 280/91; 180/79; 104/244.1
[58] Field of Search ................... 280/771, 776, 91, 94, 280/95 R, 93, 267, 269, 247; 180/131, 32, 679, 329, 330; 104/242–247, 119, 130, 215; 105/215

[56] References Cited

U.S. PATENT DOCUMENTS

| | | | |
|---|---|---|---|
| 2,090,409 | 8/1937 | Vaszin | 104/247 |
| 2,125,590 | 8/1938 | Smallwood | 104/247 |
| 2,925,875 | 2/1960 | Bourdon | 104/245 |
| 3,198,541 | 8/1965 | Christenson et al. | 280/91 |
| 3,338,182 | 8/1967 | Maestrelli | 104/247 |
| 3,363,584 | 1/1968 | Brush et al. | 104/247 |
| 3,502,040 | 3/1970 | Reilly | 104/247 |
| 3,587,767 | 6/1971 | Gamannt | 280/95 R X |
| 3,675,583 | 7/1972 | Solbert et al. | 104/247 |
| 3,724,584 | 4/1973 | Varichon | 180/79 |
| 3,796,165 | 3/1974 | Goode | 104/247 |
| 3,812,789 | 5/1974 | Nelson | 104/130 |
| 3,831,527 | 8/1974 | Peterson | 105/215 |
| 3,853,069 | 12/1974 | Goodwin | 104/245 |
| 3,858,523 | 1/1975 | Allsup, Jr. | 104/147 |
| 3,872,793 | 3/1975 | Patin | 104/119 X |
| 3,872,794 | 3/1975 | Goode | 104/247 |
| 3,945,455 | 3/1976 | Hamada et al. | 180/79 |
| 4,013,301 | 3/1977 | Gaskin | 280/95 R |
| 4,034,680 | 7/1977 | Hamada et al. | 104/247 |
| 4,105,086 | 8/1978 | Ishii et al. | 280/91 X |
| 4,183,304 | 1/1980 | Forster | 104/119 X |

FOREIGN PATENT DOCUMENTS 2628217  12/1977  Fed. Rep. of Germany ...... 180/131

*Primary Examiner*—Joseph F. Peters, Jr.
*Assistant Examiner*—Norman L. Stack, Jr.
*Attorney, Agent, or Firm*—Thomas H. Murray

[57] ABSTRACT

Steering apparatus for a reversible vehicle of the type adapted to travel on a guideway having at least one guide means extending parallel to the desired course of the vehicle, and wherein the vehicle includes front and rear guideaxle means adapted to follow the guide means together with front and rear wheel assemblies each having a pair of steerable wheels interconnected by tie rod means. The invention resides in the provision of a novel gear and linkage mechanism interconnecting respective wheel assemblies with the guideaxle means such that when the direction of movement of the vehicle is reversed, so also is the direction of rotation of the wheels about vertical axes in response to movement of the guideaxle means in one direction or the other.

8 Claims, 6 Drawing Figures

STEERING SENSE REVERSING MECHANISM FOR GUIDED VEHICLES

BACKGROUND OF THE INVENTION

The present invention is particularly adapted for use with vehicles which travel over a roadway or guideway having longitudinal side guides which are engaged by guideaxles and wheels at the front and rear of the vehicle for sensing a curvature in the side guides and for causing turning of both the front and rear wheels of the vehicle to negotiate a turn in the roadway. Turning of both the front and rear wheels is desired to cause the vehicle to accurately follow a small radius curve without lateral slippage of pneumatic tires or the like on the vehicle and without bumping against the side guides as would occur, for example, if only one set of wheels were steerable.

On guided vehicles of this type with independent front and rear steering, the steering sense (i.e., the direction of wheel rotation which results from a guideaxle displacement in one direction) is opposite for front and rear steering. For example, in a left turn the front guideaxle may bear on the right-hand side guide and is displaced to the left causing a counterclockwise rotation of the front wheels about their kingpins when viewed from above. On the other hand, the rear guideaxle bears on the left-hand side guide and is displaced to the right to cause clockwise rotation of the rear wheels. When the vehicle direction of motion is reversed, the steering sense of the front and rear steering mechanisms must be reversed also. A reversing mechanism for this purpose must provide reversed steering sense upon application of an actuator force and hold position without continuous application of the force. At the same time, it should be compact, provide for minimum lost motion, and preferably be enclosed for all-weather operation.

In the past, various systems for reversing the steering sense of guided vehicles have been provided including one which manually translates a control arm attachment across the steering arm fulcrum. This arrangement, however, is manual, must be performed in a maintenance facility, necessitates moving the control rod through a large space envelope and is vulnerable to contamination or icing. Another method previously used reverses steering sense by alternating the links that couple the guideaxle to a reversing toggle. Here, again, the coupling links require a large space envelope and protection during all-weather operation is not readily possible.

SUMMARY OF THE INVENTION

In accordance with the present invention, a sense reversing mechanism for the front and rear wheels of a guided vehicle is provided wherein reversal can be accomplished by simple actuation of a control lever, and wherein manual rearrangement of parts is obviated. At the same time, the mechanism of the invention is compact, is enclosed to facilitate all-weather operation and, at the same time, provides for minimum lost motion.

Specifically, and in accordance with the invention, there is provided sense reversing mechanisms connecting front and rear wheel assemblies of a guided vehicle with front and rear guideaxle means, respectively, and adapted to steer the wheel assemblies in opposite senses in response to movement of guideaxle means, depending upon the direction of movement of the vehicle. The sense reversing mechanisms each comprises a steering arm having one end connected to an associated guideaxle means and a control arm having one end connected to an associated one of the tie rod means interconnecting front or rear wheels. The opposite ends of the steering and control arms are journaled within a gearcase which contains gear means for interconnecting the steering and control arms. Means are provided for shifting the gear means such that in one position of the gear means, clockwise rotation of the control arm will cause clockwise rotation of the steering arm while in the other position of the gear means, clockwise rotation of the steering arm will cause counterclockwise rotation of the control arm.

In the preferred embodiment of the invention, the gear means comprises a first gear device connected to the control arm and rotatable therewith, a second gear device connected to the steering arm and rotatable therewith, a third gear device in permanent meshing engagement with the second gear device, and means for selectively engaging either the second or third gear device with the first gear device.

The above and other objects and features of the invention will become apparent from the following detailed description taken in connection with the accompanying drawings which form a part of this specification, and in which.

Figure 1:
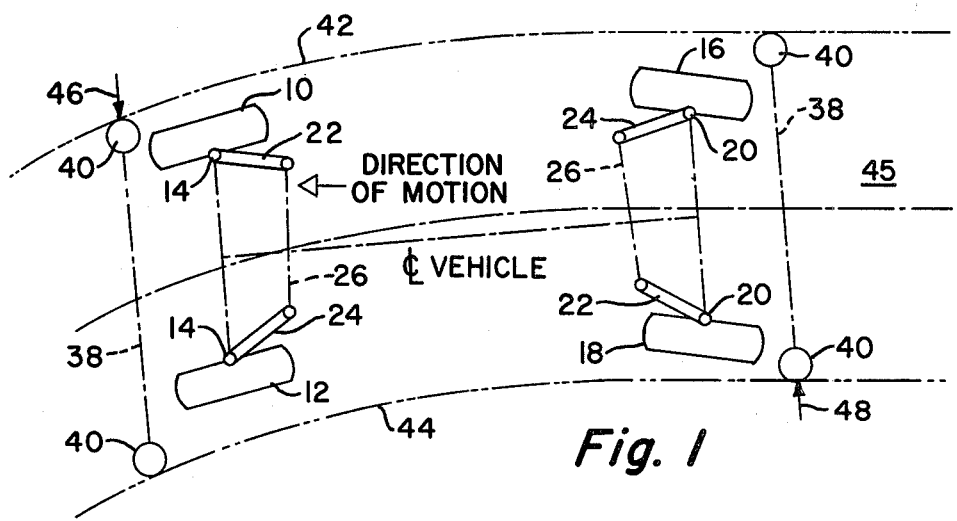
FIG. 1 is a schematic illustration of the manner in which a vehicle, having both front and rear steerable wheels, is guided along a guideway by guideaxles.
Figure 2:
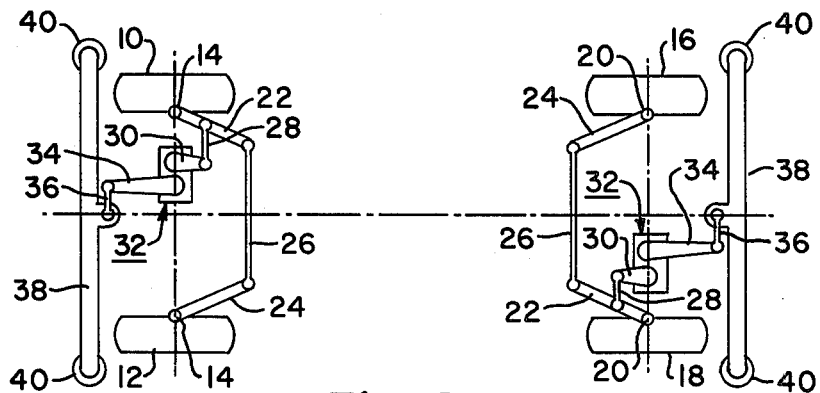
FIG. 2 is a top view of front and rear steering mechanisms incorporating the sense reversing mechanism of the invention.

With reference now to the drawings, and particularly to FIGS. 1 and 2, a steering system for a guided vehicle is shown including front wheels 10 and 12 pivotal about vertical kingpins 14 and rear wheels 16 and 18 pivotal about vertical kingpins 20. Rotation of the wheels is effected by means of steering arms 22 and 24 interconnected by means of a tie rod 26 in the usual configuration such that rotation of the wheels 10 and 12, for example, is synchronized about the kingpins 14. One of the steering arms 22 is connected through a control rod 28 to a control arm 30 which forms a part of the sense reversing mechanism 32 of the present invention.

The sense reversing mechanism 32, in turn, is connected through a steering arm 34 and link 36 to forward and aft transverse guideaxles 38. The guideaxles 38, as shown, are provided with rollers 40 at their opposite ends which rotate about vertical axes and which, as shown in FIG. 1, are adapted to engage guide means or steering rails 42 and 44 on opposite sides of a guideway 45 on which the vehicle travels. Assuming that the direction of movement of the vehicle is to the left as viewed in FIG. 1, and assuming further that it is making a left-hand turn, it will be appreciated that a force, indicated by the arrow 46, will be imparted to the front guideaxle 38 by its engagement with the steering rail 42, causing it to translate or move to the left. At the same time, a force indicated by the arrow 48 will be imparted on the rear guideaxle 38 by the steering rail 44, causing it to move to the right. In this process, the front wheels 10 and 12 must rotate in a counterclockwise direction about the kingpins 14 while the rear wheels 16 and 18 must rotate in clockwise directions about the kingpins 20. Furthermore, when the direction of movement of the vehicle is reversed such that it moves to the right rather than to the left, the translation imparted to the front and rear guideaxles 38 must be reversed with the front (left-hand as shown) guideaxle being forced upwardly by steering rail 44 as viewed in FIG. 1 while the rear guideaxle (right-hand as shown) is forced downwardly by the guideway or steering rail 42. Hence, some means must be provided for reversing the effect of a movement by the guideaxles 38, depending upon the direction of movement of the vehicle.

Figure 3:
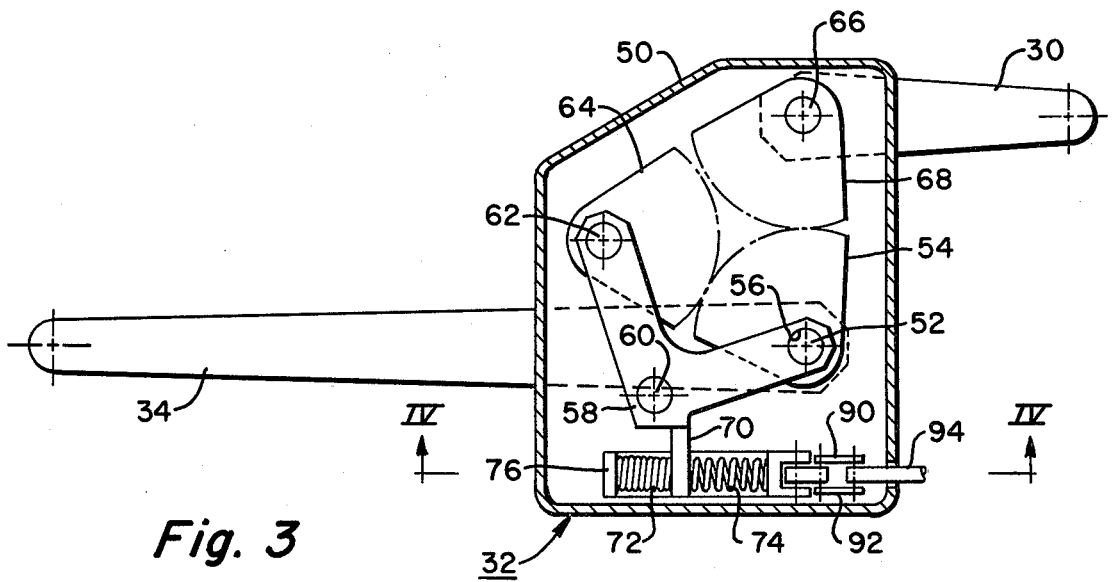
FIG. 3 is a top view of one embodiment of the sense reversing mechanism of the invention.

One embodiment of the invention for effecting reversal is shown in FIG. 3 wherein elements corresponding to those of FIGS. 1 and 2 are identified by like reference numerals. The steering arm 34 and control arm 30 extend into a gearcase 50. The end of the steering arm 34 opposite its pivotal connection to the link 36 is keyed or otherwise securely fastened to a pin 52. Also keyed or otherwise securely fastened to the pin 52 is a first gear segment 54. The pin 52, in turn, is rotatably carried within an opening 56 formed in one leg or arm of an L-shaped lever 58 which can pivot about a pin 60 secured to the upper and lower walls of the gearcase 50. The end of the other arm of the L-shaped lever 58, opposite the pin 52, carries a rotatable pin 62 which, in turn, has a second gear segment 64 keyed thereto. The gear segments 54 and 64 have equal radii and are in constant meshing engagement. The end of the control arm 30 opposite its connection to control rod 28 is secured to a pin 66 which is rotatably carried in the upper and lower walls of the gearcase 50. Also keyed or otherwise secured to the pin 66 so as to rotate therewith is a third gear segment 68.

With the arrangement shown, and remembering that the L-shaped lever 58 can rotate about pin 60, counterclockwise rotation of the lever 58 will cause gear segment 54 to engage or mesh with gear segment 68 while disengaging gear segment 64 from gear segment 68. Furthermore, it will be appreciated that at any one time, only one of the gear segments 54 or 64 can mesh with gear segment 68. Under the conditions assumed, with gear segment 54 in meshing engagement with gear segment 68, clockwise rotation of steering arm 34 about the axis of pin 52 will cause gear segment 54 to rotate in a clockwise direction also while rotating gear segment 68 and control arm 30 in a counterclockwise direction.

On the other hand, when the L-shaped lever 58 is rotated in a clockwise direction as viewed in FIG. 3, gear segment 54 will no longer mesh with gear segment 68. Rather, gear segment 64 will now mesh with gear segment 68. The result is that clockwise rotation of steering arm 34 now causes counterclockwise rotation of gear segment 64 and clockwise rotation of gear segment 68 and control arm 30. The net effect, of course, is to reverse the direction of movement of arm 30 to change the steering sense for a given direction of rotation of the arm 34. Stated in other words, and since the arm 34 is connected to a guideaxle 38, the arm 30 can be made to rotate in the same sense, depending upon the positions of gear segments 54 and 64, regardless of whether the guideaxle moves to the right or left.

The L-shaped lever 58 is provided with a lug 70 disposed between two coil springs 72 and 74. The opposite ends of the springs 72 and 74 are constrained by upstanding portions of a spring carrier 76. Pivotally carried on the spring carrier 76 about axis 77 is a latch 78 which, in the position shown in FIG. 4, has a projection held within a first detent 80 in the gearcase 50 by means of a latch leaf spring 82. The other end of the latch 78 is provided with a projection 84 which engages a latch toggle 86 having one end pivotally connected to the spring carrier 76 at 88 and its other end is pivotally connected to a pair of shift links 90 and 92 which are, in turn, pivotally connected to a shift rod 94. In the positions shown in FIGS. 3 and 4, spring 72 is compressed while spring 74 is extended. The spring 72 applies a force on the L-shaped lever 58 tending to rotate it in a counterclockwise direction which engages the gear segment 54 with gear segment 68 while disengaging gear segment 64 from gear segment 68. In this position, a rotary motion of the steering arm 34 is transmitted directly through gear segments 54 and 68 to the control arm 30.

Figure 4:
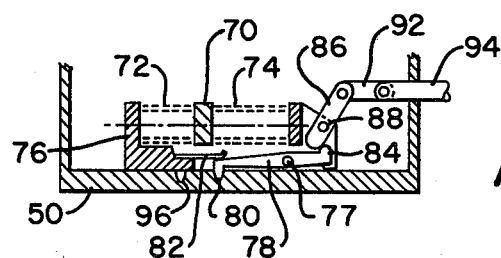
FIG. 4 is a cross-sectional view taken substantially along line IV—IV of FIG. 3 showing the gear-shifting latch mechanism of the invention.

To reverse the foregoing actions, the shift rod 94 is moved to the left as viewed in FIGS. 3 and 4, thereby rotating the latch toggle 88 counterclockwise. At approximately mid-travel of the latch toggle 86, the latch 78 is rotated in a clockwise direction and withdrawn from detent 80 in the gearcase 50. Compressive force exerted by the spring 72 now drives the spring carrier 76 to the left as viewed in FIGS. 3 and 4 to a position where it is midway between detent 80 and a second detent 96. Continued leftward translation of the shift rod 94 then rotates the latch toggle 86 to a position where it is stopped against the spring carrier 76. Continued leftward movement of the shift rod 94 then forces the spring carrier 76 further to the left until projection 80 on latch 78 now is forced into detent 96. In this position of the spring carrier 76, a leftward force is applied to the lug 70, thereby forcing the L-shaped lever 58 to rotate in a clockwise direction to disengage the gear segment 54 from segment 68 while engaging segment 64 with segment 68. In this position, it will be appreciated that clockwise rotation of arm 34, for example, will result in a similar clockwise rotation of the arm 30. By pulling the shift rod 94 to the right rather than pushing to the left, latch 78 is disengaged from detent 96 and spring carrier 76 is moved to the right into the position shown in FIG. 4.

Figure 5:
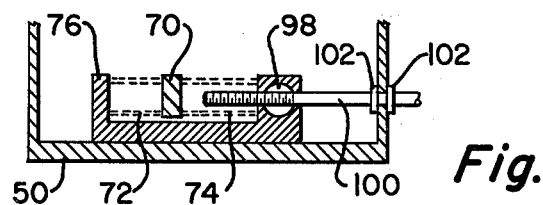
FIG. 5 is a cross-sectional view similar to that of FIG. 4, showing an alternate means for actuating the gears in the sense reversing mechanism of FIG. 3.

An alternative embodiment of the latching mechanism is shown in FIG. 5 wherein elements corresponding to those of FIG. 4 are identified by like reference numerals. In this case, however, the spring carrier 76 is provided with a spherical bore which receives a spherical nut 98. Threaded through the nut 98 is a threaded shaft 100 which is restrained against translational movement by flanges 102 on either side of the wall of the gearcase 50. Rotation of the shaft 100, however, will cause the spring carrier 76 to translate to the right or left, thereby compressing spring 72 or spring 74 and causing the L-shaped lever to either engage gear segment 54 or 64 with segment 68.

From the size of the gear segments shown in FIG. 3, it will be appreciated that the mechanism provides a 1:1 steering gain ratio of forward to reverse operation.

Figure 6:
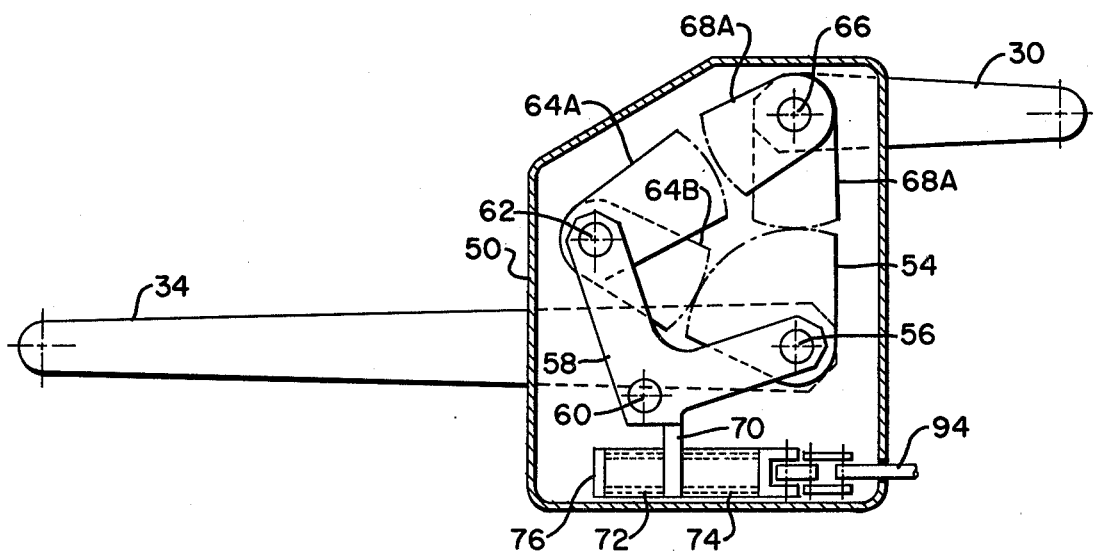
FIG. 6 is a top view similar to that of FIG. 3 but showing an alternative embodiment of the invention wherein the turning ratio in one sense between steering arm and control arm is other than 1:1.

Other ratios, however, may be provided as illustrated by the embodiment of FIG. 6 wherein elements corresponding to those of FIG. 3 are again identified by like reference numerals. In this case, the idler gear segment 64 of FIG. 3 is replaced by stacked, interconnected gear segments 64A and 64B; and the gear segment 68 is replaced by stacked, interconnected gear segments 68A and 68B. Segments 64B and 68B have the same radius as segment 54; however segments 64A and 68A do not. Consequently, when segment 64A is in meshing engagement with segment 68A, a ratio other than 1:1 between the travel of arm 34 and arm 30 is effected, thereby providing a different turning ratio for the forward and reverse directions.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In steering apparatus for a vehicle adapted to travel on a guideway having at least one guide means extending parallel to the desired course of the vehicle and wherein the vehicle includes front and rear guideaxle means adapted to follow the guide means together with front and rear wheel assemblies each having a pair of steerable wheels interconnected by tie rod means; the improvement in said steering apparatus of sense reversing mechanisms interconnecting the wheel assemblies with said front and rear guideaxle means respectively and adapted to steer said wheel assemblies in opposite senses in response to movement of the guideaxle means depending upon the direction of movement of the vehicle, said sense reversing mechanisms each comprising:

a steering arm having one end connected to an associated guideaxle means, a control arm having one end connected to an associated one of said tie rod means, the opposite ends of said steering and control arms being journaled within a gearcase, gear means within said gearcase for interconnecting said opposite ends of the steering and control arms, and means for shifting said gear means such that in one position of the gear means clockwise rotation of the control arm will cause clockwise rotation of the steering arm while in the other position of the gear means clockwise rotation of the steering arm will cause counterclockwise rotation of said control arm.

2. The improvement of claim 1 wherein said gear means comprises a first gear device connected to said opposite end of the control arm and rotatable therewith, a second gear device connected to said opposite end of the steering arm and rotatable therewith, a third gear device in permanent meshing engagement with said second gear device, and means for selectively engaging either said second or third gear device with the first gear device.

3. The improvement of claim 2 wherein said means for selectively engaging comprises a generally L-shaped lever pivotally connected intermediate two essentially right-angle arms to said gearcase, said second and third gear devices being pivotally carried on the ends of said arms opposite the pivotal connection of said L-shaped lever to said gearcase.

4. The improvement of claim 3 wherein said steering arm and said second gear device are pivotally connected to the end of one of said arms of the L-shaped lever.

5. The improvement of claim 3 wherein said L-shaped lever is rotatable about its pivotal connection to said gearcase from a first position where said second gear device is in meshing engagement with said first gear device while said third gear device is out of meshing engagement with said third gear device, said L-shaped lever being movable to a second position where said first gear device is out of meshing engagement with said first gear device while said third gear device is in meshing engagement with said first gear device and functions as an idler gear means between said second and first gear devices.

6. The improvement of claim 5 wherein said gear devices comprise segments.

7. The improvement of claim 3 including latch means for moving said L-shaped lever from its first position to its second position.

8. The improvement of claim 7 wherein said means for moving said L-shaped lever comprises a lug extending outwardly from said L-shaped lever adjacent its pivotal connection to said gearcase, spring devices on either side of said lug and restrained between said lug and upstanding portions of a reciprocable spring carrier, and means for reciprocating said spring carrier to alternately compress one or the other of said spring devices and rotate said L-shaped lever in one direction or the other depending upon which spring device is compressed.

* * * * *